United States Patent
Lynch et al.

(10) Patent No.: US 9,353,196 B2
(45) Date of Patent: May 31, 2016

(54) BIMODAL POLYMERIZATION PROCESS UTILIZING CHROMIUM/SILICA CATALYSTS

(71) Applicant: Equistar Chemicals, LP, Houston, TX (US)

(72) Inventors: Michael W. Lynch, West Chester, OH (US); Sebastian Joseph, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 253 days.

(21) Appl. No.: 14/085,198

(22) Filed: Nov. 20, 2013

(65) Prior Publication Data
US 2015/0141592 A1     May 21, 2015

(51) Int. Cl.
| | |
|---|---|
| C08F 4/24 | (2006.01) |
| C08F 4/06 | (2006.01) |
| C08F 210/00 | (2006.01) |
| C08F 110/02 | (2006.01) |
| C08F 4/78 | (2006.01) |

(52) U.S. Cl.
CPC ........................................ *C08F 4/78* (2013.01)

(58) Field of Classification Search
CPC ............... C08F 4/78; C08F 4/06; C08F 4/44; C08F 4/00; C08F 4/80; C08F 210/00; C08F 110/02
USPC .......................... 526/348, 352, 113, 154, 104
See application file for complete search history.

(56) References Cited

U.S. PATENT DOCUMENTS

| | | | |
|---|---|---|---|
| 6,380,311 B1 * | 4/2002 | Razavi | C08F 10/02 525/191 |
| 6,989,344 B2 | 1/2006 | Cann et al. | |
| 7,226,886 B2 | 6/2007 | Jayaratne et al. | |
| 7,504,463 B2 | 3/2009 | Cann et al. | |
| 7,521,572 B2 | 4/2009 | Jayaratne et al. | |
| 7,563,851 B2 | 7/2009 | Cann et al. | |
| 7,601,787 B2 | 10/2009 | Mavridis et al. | |
| 7,910,763 B2 | 3/2011 | Jayaratne et al. | |
| 8,318,872 B2 * | 11/2012 | Savatsky | C08F 10/00 526/113 |
| 8,318,876 B1 | 11/2012 | Larock et al. | |
| 8,420,754 B2 | 4/2013 | Cann et al. | |
| 8,507,621 B2 | 8/2013 | Jayaratne et al. | |
| 2005/0037917 A1 | 2/2005 | Cann et al. | |
| 2005/0272886 A1 | 12/2005 | Cann et al. | |
| 2006/0074205 A1 | 4/2006 | Cann et al. | |
| 2007/0060722 A1 | 3/2007 | Jayaratne et al. | |

(Continued)

FOREIGN PATENT DOCUMENTS

EP     0770629 A2     5/1997

*Primary Examiner* — William Cheung

(57) ABSTRACT

The present invention relates to novel methods for producing a bimodal or broad distribution of molecular weight polyolefin polymers using Cr/silica catalysts. In some aspects the methods utilize different pressures of hydrogen to tailor the properties of the polymer. In particular aspects, a method of preparing a polyolefin having a bimodal molecular weight distribution, comprising:
(a) preparing a reaction mixture comprising a monomer, a catalyst, and an organic solvent;
(b) heating the reaction mixture under a first set of reaction conditions to effect a first polymerization comprising the polymerization of a first fraction of the monomer; and
(c) heating the reaction mixture under a second set of reaction conditions to effect a second polymerization comprising the polymerization of a second fraction of the monomer.

19 Claims, 1 Drawing Sheet

Table 1: Reaction Conditions and Melt Index of the Produced Polyethylene Polymers

| Exp. | H₂ (dp psi) | Pressure (psi) | hexene (mLs) | Catalyst (g) | [C2=] mole% | Mileage (gPE/g cat) | MI | HLMI | HLMI/MI | Density (g/mL) | Polymer (g) | Ethylene flow totalizer (g) |
|---|---|---|---|---|---|---|---|---|---|---|---|---|
| A | 340 | 550 | 0 | 0.02 | 13.7 | 4176 | 1.04 | 64.3 | 61.8 | 0.9585 | 79.3 | 93 |
| B | 0 | 532 | 0 | 0.03 | 13.7 | 2652 | 0.87 | 58.2 | 67.2 | 0.9489 | 69.0 | 85 |
| C | 170 | 550 | 5 | 0.02 | 16.8 | 5371 | 0.49 | 32.6 | 66.2 | 0.9442 | 64.5 | 75 |
| D | 340 | 550 | 0 | 0.01 | 13.7 | 7613 | 0.038 | 6.0 | 157.7 | 0.9497 | 91.4 | 53 |
|   | 0 | 381 | 5 |   | 12.6 |   |   |   |   |   |   | 53 |
| E | 340 | 550 | 0 | 0.01 | 13.7 | 5538 | 0.064 | 12.5 | 195.4 | 0.9492 | 60.9 | 37 |
|   | 100 | 388 | 5 |   | 12.6 |   |   |   |   |   |   | 35 |
| F | 0 | 532 | 0 | 0.020 | 13.7 | 4043 | 0.049 | 8.11 | 165 | 0.9466 | 80.9 | 57 |
|   | 100 | 388 | 5 |   | 12.6 |   |   |   |   |   |   | 42 |

Legend: psi = pounds per square inch; mLs = milliliters; g = grams; [C2=] = ethylene concentration; gPE/g cat = grams polyethylene per gram catalyst; MI = melt index; HLMI = high load melt index; and g/mL = grams per milliliter.

(56) References Cited

U.S. PATENT DOCUMENTS

| | | |
|---|---|---|
| 2008/0004460 A1 | 1/2008 | Jayaratne et al. |
| 2008/0132640 A1 | 6/2008 | Mavridis et al. |
| 2009/0198078 A1 | 8/2009 | Jayaratne et al. |
| 2009/0312506 A1 | 12/2009 | Cann et al. |
| 2010/0291334 A1 | 11/2010 | Cann et al. |
| 2011/0060111 A1 | 3/2011 | Cann et al. |
| 2011/0190460 A1 | 8/2011 | Jayaratne et al. |
| 2013/0053523 A1 | 2/2013 | Jayaratne et al. |

* cited by examiner

Table 1: Reaction Conditions and Melt Index of the Produced Polyethylene Polymers

| Exp. | H₂ (dp psi) | Pressure (psi) | Hexene (mL) | Catalyst (g) | [C2=] mole% | Mileage (gPE/g cat) | MI | HLMI | HLMI/MI | Density (g/mL) | Polymer (g) | Ethylene flow totalizer (g) |
|---|---|---|---|---|---|---|---|---|---|---|---|---|
| A | 340 | 550 | 0 | 0.02 | 13.7 | 4176 | 1.04 | 64.3 | 61.8 | 0.9585 | 79.3 | 93 |
| B | 0 | 532 | 0 | 0.03 | 13.7 | 2652 | 0.87 | 58.2 | 67.2 | 0.9489 | 69.0 | 85 |
| C | 170 | 550 | 5 | 0.02 | 16.8 | 5371 | 0.49 | 32.6 | 66.2 | 0.9442 | 84.5 | 75 |
| D | 340 | 550 | 0 | 0.01 | 13.7 | 7613 | 0.038 | 6.0 | 157.7 | 0.9497 | 91.4 | 53 |
|   | 0 | 381 | 5 |   | 12.6 |   |   |   |   |   |   | 53 |
| E | 340 | 550 | 0 | 0.01 | 13.7 | 5538 | 0.064 | 12.5 | 195.4 | 0.9492 | 60.9 | 37 |
|   | 100 | 388 | 5 |   | 12.6 |   |   |   |   |   |   | 35 |
| F | 0 | 532 | 0 | 0.020 | 13.7 | 4043 | 0.049 | 8.11 | 165 | 0.9496 | 80.9 | 57 |
|   | 100 | 388 | 5 |   | 12.6 |   |   |   |   |   |   | 42 |

Legend: psi = pounds per square inch; mLs = milliliters; g = grams; [C2=] = ethylene concentration; gPE/g cat = grams polyethylene per gram catalyst; MI = melt index; HLMI = high load melt index; and g/mL = grams per milliliter.

BIMODAL POLYMERIZATION PROCESS UTILIZING CHROMIUM/SILICA CATALYSTS

BACKGROUND OF THE INVENTION

I. Field of the Invention

In some embodiments, the present invention relates to novel methods of using hydrogen in Cr/silica-based olefin polymerization processes to modulate the properties of the resulting polyolefin polymer. For example, such methods may be used to make polymers having a broad and/or a bimodal distribution of molecular weights.

II. Description of Related Art

By broadening the molecular weight distribution of a polyolefin polymer improved physical and rheological properties can be obtained. However, the production of such polymers can be difficult. Attempts to obtain such polymers by mixing two or more sets of polymer molecules, each having a different and distinct average molecular weight, typically result in compositions that do not act like a homogenous mixture of the two or more polymers because the mixing process does not go to completion and small pockets of each polymer were retained. Examples of attempts to mix polymers in this manner are described in U.S. Pat. Nos. 3,592,880, 4,352,915, and 4,357,448.

Other attempts to address this problem include using two reactors in series to produce different polymers in a continuous process is described in European patent 0580930A1 and PCT Patent Publication WO 1995/011930. Lack of flexibility is one of the downsides of these processes. Typically, the processes require the production of the higher MW polymer in the first reactor because they require the use of a low concentration of hydrogen in the first reaction vessel and a higher concentration of hydrogen in the second reaction vessel. Furthermore, neither of these patents provides an example of using a chromium/silica catalyst to perform such a two reactor process. PCT Patent Publication WO 1995/011930 notes that the preferred method of controlling the molecular weight with a chromium catalyst is through changing the polymerization temperature rather than modifying the presence and concentrations of hydrogen gas. Additionally, the method described in both publications requires that if a comonomer is used, the comonomer is preferentially used in the first reactor vessel. Using a comonomer in only the first reactor vessel limits the types and properties of the polymers that can be produced in the second reaction vessel.

In U.S. Pat. No. 6,063,878, attempts were made to address these difficulties by utilizing other factors such as ethylene concentration and temperature to control the average molecular weight of the polymers produced in the loop system. While a broad or bimodal distribution of molecular weight polymers could be obtained, polymer properties could only be controlled in to a limited extent.

In U.S. Pat. No. 7,034,092, a bimodal dual reactor polymerization system preferably using a Ziegler-Natta catalyst or a metallocene catalyst with hydrogen gas was presented, but the method requires greater than 30 wt % of solids compared to the diluent in the first reactor in order to have sufficient control over the properties of the bimodal product. This particular polymerization methodology, in order to obtain the effective ratio of solids to diluent, requires the use of high, specific amounts of ethylene compared to diluent which can limit the types of polymers made with the process.

As such, the development of more advantageous processes to make homogenous polyolefins that have a broad and/or bimodal distribution of molecular weights is desirable.

SUMMARY OF THE INVENTION

In one aspect of the present inventive there are provided methods of preparing a polyolefin having a bimodal molecular weight distribution, comprising:

(a) preparing a reaction mixture comprising a monomer, a catalyst, and an organic solvent;

(b) heating the reaction mixture under a first set of reaction conditions to effect a first polymerization comprising the polymerization of a first fraction of the monomer; and (c) heating the reaction mixture under a second set of reaction conditions to effect a second polymerization comprising the polymerization of a second fraction of the monomer;

wherein the monomer is a terminal alkene$_{(C2-8)}$, the catalyst comprises chromium on silica, and the first or second set of reaction conditions comprises the presence of hydrogen, provided that the first set of reaction conditions and the second set of reaction conditions are not the same; and whereby the method produces a polyolefin having a bimodal molecular weight distribution.

In some embodiments, the terminal alkene$_{(C2-8)}$ is ethylene. In some embodiments, the polyolefin is polyethylene. In some embodiments, the organic solvent is isobutane.

In some embodiments, the first mode of the molecular weight distribution is from 80,000 Dalton to 130,000 Daltons. In some embodiments, the first mode of the molecular weight distribution is from 80,000 Dalton to 300,000 Daltons. In some embodiments, the second mode of the molecular weight distribution is from about 84,000 Daltons to 300,000 Daltons. In some of these embodiments, the first and the second modes differ by at least 4,000 Daltons.

In some embodiments, the first set of reaction conditions comprises a temperature from 85° C. to 110° C. In some embodiments, the second set of reaction conditions comprises a temperature from 70° C. to 110° C.

In some embodiments, the catalyst comprises 0.1 to 2% by weight chromium, over all its oxidation states. In some embodiments, the catalyst further comprises one or more of the elements titanium, aluminum, fluorine, boron, and phosphorus. In some embodiments, the catalyst further comprises 0.1 to 4% by weight titanium, over all its oxidation states. In some embodiments, the catalyst has a surface area from 250 m²/g to 900 m²/g and a pore volume from 1.5 mL/g to 3.0 mL/g.

In some embodiments, the hydrogen pressure of the first set of reaction conditions is from 0.1 to 2 mole %. In some embodiments, the hydrogen pressure of the second set of reaction conditions is from 0.1 to 2 mole %. In some embodiments, the hydrogen concentration of the first reaction conditions and the second reaction conditions is not the same. In some embodiments, the hydrogen pressure of the first set of reaction conditions is from 475 psi to 625 psi. In some embodiments, the hydrogen pressure of the second set of reaction conditions is from 300 psi to 450 psi. In some embodiments, the method further comprises reducing hydrogen pressure between steps (b) and (c) using a hydrogen disengagement vessel. In some embodiments, the method further comprises reducing hydrogen concentration between steps (b) and (c) using a hydrogen disengagement vessel.

In some embodiments, the first and second reaction conditions in terms of temperature, monomer concentration or comonomer concentration. For example, in some of these embodiments, the first and second reaction conditions in terms of ethylene concentration.

In some embodiments, the first and/or the second polymerization further comprises a copolymerization of the monomer with a comonomer, wherein the comonomer is a terminal alkene$_{(C2-8)}$, provided that monomer and the comonomer are not the same. In some of these embodiments the comonomer is 1-hexene. In some embodiments, the monomer is ethylene and the comonomer is 1-hexene.

In some embodiments, the reaction mixture further comprises a cocatalyst, for example, an alkyl metal of the formula $M(R)_n$, wherein M is $Al^{3+}$, $B^{3+}$, $Zn^{2+}$, or $Li^+$; R is alkyl$_{(C\leq 8)}$; and n is the number of alkyl groups, which corresponds to the oxidation state of M. In some of these embodiments, the cocatalyst is triethyl boron.

In some embodiments, the polyolefin has a melt index from 0.02 g/10 minutes to 2 g/10 minutes, a high load melt index from 2 g/10 minutes to 100 g/10 minutes, or a high load melt index to melt index ratio from 80 to 250.

In another aspect, the present invention provides methods that utilize hydrogen in a chromium/silica-based polyolefin polymerization processes to produce polyolefin polymers having a broad and/or bimodal distribution of molecular weights. In some embodiments, a hydrogen removal device, such as a hydrogen disengagement vessel is placed between two reaction vessels. In some embodiments, the use of such a device allows for the pressure of hydrogen to be lower in the second vessel relative to the first, which thereby changing the average molecular weight of the polymer produced in each of the reaction vessels. In one aspect of the present invention, there are provided novel methods for the production of a broad or bimodal distribution of different molecular weight polymers.

In another aspect, the present invention provides method of producing a polyolefin polymer exhibiting a bimodal distribution of polyolefin polymer molecules comprising: a) admixing a terminal alkene$_{(C2-8)}$ to an alkane$_{(C\leq 12)}$ diluent; b) admixing a chromium/silica catalyst; c) heating the reaction mixture; d) producing a set of polymer molecules of a first average molecular weight in a reaction mixture by contacting the terminal alkene$_{(C2-8)}$ with the chromium/silica catalyst; e) transferring the set of polymer molecules of a first average molecular weight from a first reaction vessel to a second reaction vessel or venting the reaction vessel to a pressure about equal to that of the alkane$_{(C\leq 12)}$ diluent; f) mixing or admixing the chromium/silica catalyst and the diluent; g) heating the mixture; h) admixing the terminal alkene$_{(C2-8)}$ to the mixture; i) producing a set of polymer molecules of a second average molecular weight in a reaction mixture by contacting the terminal alkene$_{(C2-8)}$ with the chromium/silica catalyst; j) admixing a terminal alkene$_{(C3-10)}$ comonomer to the mixture of steps a)-d), steps f)-i), both steps a)-d) and steps f)-i) or neither steps a)-d) or steps f)-i); and k) admixing hydrogen gas to a pressure from about 0.1 to about 2 mole % to the mixture of at least one of steps a)-d) or steps f)-i) or both steps a)-d) and steps f)-i); to produce a polyolefin polymer that exhibits a bimodal distribution of polyolefin polymer molecules. In some embodiments, the terminal alkene$_{(C2-8)}$ is ethylene. In some embodiments, the polyolefin is polyethylene. In some embodiments, the alkane$_{(C\leq 12)}$ diluent is isobutane. In some embodiments, steps a) to c) are performed in any order. In some embodiments, steps f) and g) are performed in either order. In some embodiments, the adding of the terminal alkene$_{(C2-8)}$ comprising providing a constant supply of the terminal alkene$_{(C2-8)}$ during the reaction. In some embodiments, the polyolefin polymer produced in step d) has a first average molecular weight form 80,000 to 130,000 and a second average molecular weight 84,000 to 300,000. In some embodiments, the polyolefin polymer produced in step d) has a first average molecular weight from 90,000 to 120,000 and a second average molecular weight 95,000 to 250,000. In some embodiments, the polyolefin polymer produced in step d) has a first average molecular weight from 90,000 to 120,000 and a second average molecular weight 110,000 to 180,000. In some embodiments, the polyolefin polymer produced in step h) has a first average molecular weight form 80,000 to 130,000 and a second average molecular weight 84,000 to 300,000. In some embodiments, the polyolefin polymer produced in step h) has a first average molecular weight from 90,000 to 120,000 and a second average molecular weight 95,000 to 250,000. In some embodiments, the polyolefin polymer produced in step h) has a first average molecular weight from 90,000 to 120,000 and a second average molecular weight 110,000 to 180,000. In some embodiments, the polyolefin polymer produced in step d) has a first average molecular weight form 84,000 to 300,000 and a second average molecular weight 80,000 to 130,000. In some embodiments, the polyolefin polymer produced in step d) has a first average molecular weight from 95,000 to 250,000 and a second average molecular weight 90,000 to 120,000. In some embodiments, the polyolefin polymer produced in step d) has a first average molecular weight from 110,000 to 180,000 and a second average molecular weight 90,000 to 120,000. In some embodiments, the polyolefin polymer produced in step h) has a first average molecular weight form 84,000 to 300,000 and a second average molecular weight 80,000 to 130,000. In some embodiments, the polyolefin polymer produced in step h) has a first average molecular weight from 95,000 to 250,000 and a second average molecular weight 90,000 to 120,000. In some embodiments, the polyolefin polymer produced in step h) has a first average molecular weight from 110,000 to 180,000 and a second average molecular weight 90,000 to 120,000. In some embodiments, the polyolefin polymers produced in steps d) and h) have a difference of average molecular weight of greater than 10%. In some embodiments, the polyolefin polymers produced in steps d) and h) have a difference of average molecular weight of greater than 5%. In some embodiments, in the reaction mixture in step c) the polymerization temperature from about 85° C. to about 110° C. In some embodiments, in the reaction mixture in step f) the polymerization temperature from about 70° C. to about 110° C. In some embodiments, the chromium/silica catalyst comprises 0.1 to 2% by weight chromium. In some embodiments, the chromium/silica catalyst further comprises titanium, aluminum, fluoride, boron, or phosphorus. In some embodiments, the chromium/silica catalyst further comprises 0.5 to 5% by weight aluminum. In other embodiments, the chromium/silica catalyst further comprises 0.5 to 5% by weight fluoride. In other embodiments, the chromium/silica catalyst further comprises 0.1 to 1.5% by weight boron. In other embodiments, the chromium/silica catalyst further comprises 0.1 to 1.5% by weight phosphorus. In other embodiments, the chromium/silica catalyst further comprises 0.1 to 4% by weight titanium. In some embodiments, the chromium/silica catalyst has a surface area from about 250 m²/g to about 900 m²/g and a pore volume from about 1.5 mL/g to about 3.0 mL/g. In some embodiments, the chromium/silica catalyst has a surface area of from about 400 m²/g to about 600 m²/g. In some embodiments, the chromium/silica catalyst has a pore volume from about 1.5 mL/g to about 2.5 mL/g. In some embodiments, the chromium/silica catalyst is activated by heating from about 500° C. to about 1,000° C. for a period from about 0.5 hours to about 8 hours. In some embodiments, the chromium/silica catalyst is activated by heating from about 700° C. to about 900° C. for a period from about 5 hours to about 7 hours. In some embodiments, the chromium/silica catalyst is activated by heating to about 800° C. for a period of about 6 hours. In some embodiments, the present invention provides a method further comprising using a hydrogen disengagement vessel in step d) to lower the concentration of hydrogen gas in the reaction mixture. In some embodiments, the hydrogen disengagement vessel removes from 1% to 99% of the hydrogen gas from the system. In some embodiments, the hydrogen disengagement vessel removes at least 80% of the hydrogen gas from the system. In some embodiments, the hydrogen disengagement vessel removes at least 90% of the hydrogen gas from the system. In some embodiments, the hydrogen disengagement vessel removes at least 95% of the hydrogen gas from the system. In some embodiments, the hydrogen concentration in steps a)-d) is higher than the hydrogen concentration in steps f)-h). In some embodiments, the hydrogen concentration in steps f)-h) is higher than the hydrogen concentration in steps a)-d). In some embodiments, the comonomer is 1-butene, 1-pentene, 1-hexene, 1-heptene, 1-octene, 1-decene, or 4-methyl-1-pentene. In some embodiments, the comonomer is 1-hexene. In some embodiments, the present invention provides a method further comprising adding a cocatalyst with the catalyst to the reaction mixture. In some embodiments, the cocatalyst is an alkyl metal of the formula:

$$MR_X \qquad (I)$$

wherein: M is Al, B, Zn, or Li; R is alkyl$_{(C\leq 8)}$; and X is equal to the oxidation state of M. In some embodiments, X is 1, 2, or 3. In some embodiments, the cocatalyst is of the formula: $AlR_3$, $BR_3$, $ZnR_2$, and or $LiR$. In some embodiments, R is alkyl$_{(C\leq 8)}$. In some embodiments, R is methyl or ethyl. In some embodiments, the cocatalyst is triethyl boron. In some embodiments, the reaction mixture has a pressure from about 300 psi to about 700 psi. In some embodiments, the reaction mixture in step d) has a pressure from about 475 psi to about 625 psi. In some embodiments, the reaction mixture in step h) has a pressure from about 300 psi to about 450 psi. In some embodiments, the polymer produced has a melt index from about 0.02 to about 2 g/10 minutes. In some embodiments, the polymer produced has a high load melt index from about 2 to about 100 g/10 minutes. In some embodiments, wherein the polymer produced has a high load melt index to melt index ratio from about 80 to about 250.

Other objects, features and advantages of the present disclosure will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Note that simply because a particular compound is ascribed to one particular generic formula does not mean that it cannot also belong to another generic formula.

BRIEF DESCRIPTION OF THE DRAWINGS

These and other features, aspects, and advantages of the present invention will become better understood with reference to the following description and appended claims, and accompanying drawings where:

FIG. 1 provides Table 1: Reaction Conditions and Melt Index of the Produced Polyethylene Polymers.

It should be understood that the various embodiments are not limited to the arrangements and instrumentality shown in the drawings.

DESCRIPTION OF ILLUSTRATIVE EMBODIMENTS

I. Bimodal Polyolefin Product Production in a Loop Reactor Using Hydrogen Gas

In one aspect of the present invention, there are provided methods for production polyolefin polymers having a broad and/or bimodal molecular weight distribution. In some embodiments, the methods may produce a wider range of polymers, including low, intermediate and high melt index polymers and allow for the utilization of hydrogen gas to tailor a polymer with more control of key polymer properties such as long chain branching.

One of the characteristics of a polymer is its molecular weight distribution (MWD). At least in part, this characteristic determines the mechanical properties of the polymer and thereby it influences the potential applications of the polymer. Similarly, the distribution and scatter of the molecular weight will in part determine the rheological properties of the polymer.

Typically, when the molecular weight distribution of the polymer is increased, an improvement results in the physical properties of the polymer resin, such as environmental stress crack resistance (ESCR), impact strength, or tear in film resins. Increased average molecular weight though may lead to polymers which are more difficult and slower to convert into a usable material. In applications that require certain physical properties such a fast conversion but also require the physical properties of a high average molecular weight polymer; a bimodal or broad distribution of molecular weights may be beneficial. Such polymers may have improved melt indices, high load melt indexes, or contain other advantageous physical and rheological properties compared to polymers of a narrower molecular weight distribution.

Without being bound by theory, a polyolefin which exhibits both a high molecular weight and a broad or bimodal molecular weight distribution may be easier to convert or manipulate due to the lower molecular weight fraction of the polyolefin. Conversely, the higher molecular weight fraction generally may give the polymer greater strength and other improved physical properties. As such, the polyolefin that contains a bimodal or broad distribution of molecular weights may be manipulated or converted more effectively.

The molecular weight distribution of a polymer may be determined by using such techniques as dynamic light scattering or gel permeation chromatography. Whenever actual molecular weights are provided in the claims, these are to be determined by through gel permeation chromatography unless specifically noted otherwise. In gel permeation chromatography, the molecular weight distribution is determined by the area under the chromatogram. In some instances, the polydispersity index may be used to describe the molecular weight distribution of the polyolefin. In some embodiments, the average molecular weight may vary according to the desired application of the polymer, for example, it may vary from about 80,000 to about 800,000 Daltons. In some embodiments, the molecular weight distribution of the polymer produced in each reaction vessel may cover a narrow range of molecular weights or a broad range of molecular weights.

In some embodiments, the present invention provides methods of olefin polymerization that use hydrogen to produce polymer products in a two or more reactor system to produce a homogenized polymer having a bimodal molecular weight distribution. In some embodiments, the present invention may produce a polymer which is allows for more effective mixing or with better physical and rheological properties such as better processibility and mechanical polymers. Furthermore, in other embodiments, the methods of the present invention may be used to target the comonomer to the higher molecular weight (MW) portion of the molecular weight distribution (MWD), thereby more effectively using the incorporated comonomer into the resultant polymer, and thereby leading to less total polymer branching.

In some embodiments, the present invention provides processes for the polymerization of a 1-olefin to produce a polyolefin through the polymerization of a 1-olefin in the presence of a chromium catalyst and a comonomer that is another 1-olefin from 3 to 10 carbons in length using two or more reactor vessels in a loop polymerization in the liquid phase. The 1-olefin comonomer may be 1-butene, 1-pentene, 1-hexene, 1-heptene, 1-octene, 1-decene, or 4-methyl-1-pentene. In some embodiments, the comonomer may be 1-hexene. Such loop polymerization methodologies are well known in the art and taught at least by U.S. Pat. Nos. 3,152,872, 3,242,150 and 4,613,484, all of which are incorporated herein by reference. The reactors or reaction vessels may be connected in series. The monomer and the catalyst may be introduced together or separately into the first reactor vessel. The first reactor vessel may have a polymerization temperature from about 80° C. to about 110° C. In some embodiments, hydrogen gas is added to the reactor vessel from about 0.1 to about 2 mole %. The first reactor vessel may be utilized to produce a polymer with a high melt index, an intermediate melt index or a low melt index depending of the exact reaction conditions used. In some embodiments, the melt index of the produced polymer is from about 1 to about 10, from about 0.1 to about 1, from about 0.01 to about 0.1, or from about 0.001 to about 0.01.

In some embodiments, the resultant homopolymer is transferred from the first reaction vessel to the second reaction vessel. In some embodiments, the transfer may include the use of a hydrogen disengagement vessel to remove hydrogen gas used in the first reaction vessel before polymerization in the second reaction vessel. The polymerization in the second reaction vessel may also contain a terminal alkene comonomer with a carbon chain from 3 to 10 carbons in length. The terminal alkene comonomer may be 1-butene, 1-pentene, 1-hexene, 1-heptene, 1-octene, 1-decene, or 4-methyl-1-pentene. In some embodiments, the comonomer may be 1-hexene. The second reactor may be at the lower, the same, or higher temperature than the first reaction vessel. In some embodiments, the preferred polymerization temperature for the second reactor vessel is from about 70° C. to about 110° C. In some embodiments, the reaction mixture in the second reactor contains hydrogen gas. The hydrogen gas may be present from about 0.1 to about 2 mole %. The second reaction vessel may produce a polymer with a higher, lower or similar average molecular weight or melt index.

In some embodiments, the methods disclosed herein use an oxide-supported chromium catalyst. Suitable oxide supports contain oxygen and one or more elements selected from silicon, aluminum, titanium, boron, magnesium, fluorine, and zirconium. Examples include silicas, silica-aluminas, aluminas, zirconias, titanias, borias, magnesias, aluminum phosphates, and mixtures thereof. Silicas are most preferred. Preferred oxide supports have surface areas in the range of 200 to 900 $M^2$/g, more preferably from 300 to 600 $M^2$/g. Preferred oxide supports have pore volumes within the range of 1 to 4 mL/g, more preferably from 1.5 to 3.5 mL/g. Suitable oxide supports are described in U.S. Pat. Nos. 2,825,721; 3,819,811; 4,053,565; 4,177,162; 5,037,911; 6,147,171; and 6,569,960, each of which are incorporated herein by reference.

Chromium sources for the oxide-supported catalyst are well known. In some embodiments, one or more chromium-containing compounds capable of reacting or interacting with oxygen atoms or surface hydroxyl groups of the support are used. Examples include chromium trioxide, chromium nitrate, organochromium compounds, chromium sulfate, ammonium chromate, chromate esters, chromium acetate, and the like. In some embodiments, chromium sources are disclosed in the following patents may be used: U.S. Pat. Nos. 2,825,721; 4,031,298; 4,173,548; 5,198,400; and 6,465,586, each of which are incorporated herein by reference.

In some embodiments, the chromium source can be combined with the support in any desired manner. U.S. Pat. Nos. 3,976,632 and 4,297,460, each of which are incorporated herein by reference, provide a few examples of how to combine the chromium source and the support. The amount of chromium in the oxide-supported chromium catalyst can vary, but it is preferably in the range of 0.1 to 2.5 wt. %, more preferably from 0.5 to 2 wt. %.

In some embodiments, the oxide-supported chromium catalyst can be modified with compounds containing boron, phosphorus, aluminum, vanadium, titanium, zirconium, fluorine (as fluoride), or other elements. The modifiers are typically included to increase activity, improve operability, or enhance the processability or physical properties of the ethylene homopolymer. Many of these modifiers interact with oxygen atoms or surface hydroxyl groups of the oxide support. Examples include borate esters, boron halides, trialkyboranes, triarylboranes, phosphate esters, aluminum alkoxides, alkylaluminum compounds, aluminum halides, vanadium halides, titanium halides, organotitanates, zirconium halides, organozirconates, and the like, and mixtures thereof. Additional examples of suitable modifiers are disclosed in U.S. Pat. Nos. 2,825,721; 3,780,011; 4,173,548; 4,374,234; 4,981,927; and 5,198,400, which are incorporated herein by reference.

Prior to their use in the inventive process, the oxide-supported chromium catalysts may be activated by conventional techniques. In particular, the oxide-supported chromium catalysts, prior to use, are normally activated by heating to elevated temperatures under oxidizing conditions to convert at least some of the Cr(III) species to Cr(VI). Thereafter, the catalyst is usually allowed to cool in an inert atmosphere to preserve the highly oxidized chromium species. Suitable activation schemes have been described elsewhere in considerable detail; see, e.g., U.S. Pat. Nos. 3,281,405; 4,173,548; 5,093,300; and 6,632,896, which are incorporated herein by reference.

Such polymerization may require an organometallic catalyst. The organometallic compounds maybe alkyls of Al, B, Li, and/or Zn. In some embodiments of the present invention, a chromium catalyst is used. In some embodiments, the chromium catalyst comprises from about 0.1% to about 2.5% chromium. Additionally, in some embodiments, the chromium catalyst further comprises titanium from about 1% to about 5% of the weight of the catalyst. In some embodiments, the catalyst further comprises from about 0.1 to about 1.5 wt % B and/or P. In some embodiments, the catalyst also comprises from about 0.5 to about 5 wt % Al and/or F. In some embodiments, the catalyst may be immobilized using a solid support such as silica, alumina, titanium oxide, or another porous inert material with a high surface area. In some embodiments, the catalyst solid support may have a surface area from about 250 to about 900 $m^2$/g. In some preferred embodiments, the surface area may be from about 400 to about 600 $m^2$/g. The solid support may also contain pores with have an average pore volume from about 1 to 3 mL/g.

The average pore volume of the solid support may preferably be from about 1.5 to about 2.5 mL/g. Additionally, the catalyst may be activated by heating the chromium on the solid support to a temperature from about 500° C. to about 1000° C. The catalyst may be activated by heating at one of the above temperatures for a period from about 0.5 hours to about 10 hours.

In some embodiments, the polymer produced in the first reaction may be from 10% to about 90% of the weight of the total polymer. In some embodiments, the amount of polymer produced in the first reaction vessel is from about 40% to about 60% of the weight of the total polymer. Additionally, the process provided in the current invention may lead to a polymer with a broad or bimodal molecular weight distribution or it may produce a polymer with improved physical or rheological properties produced by greater homogeneity or wider breadth of average molecular weights.

The above polymerization reaction may be carried out using a wide range of different inert solvents or diluents. For example, alkyl hydrocarbons including, but not limited to, isobutane, propane, hexane, and cyclohexane may be used as well as aromatic hydrocarbons including, but not limited to, toluene and xylenes. In some embodiments, the solvents are inert to the reaction conditions. In some embodiments, the preferred diluent may be isobutane.

The Cr/silica catalyst used to produce the polyolefin may require the addition of a cocatalyst in order to achieve optimal catalytic activity or to further tailor polymer properties. The cocatalyst may be an organometallic compound such as alkyls of Al, B, Li, and or Zn. The pressure utilized in the polymerization process may range from about 300 to about 650 psi depending on the conditions used and the location of the reactor in the loop. In some embodiments, the first reactor has a higher pressure than the second reactor. For example, the pressure in the first reactor may be from about 475 to about 625 psi, while the pressure in the second reactor may be from about 300 to about 450 psi. While these provide exemplary ranges, the pressure may be increased as need in order for the olefin monomer to remain dissolved in the diluent.

In some embodiments, the polymerization process can be carried out continuously such that the reaction mixture is continuously transferred from the first reaction vessel to the second reaction vessel through a transfer line. The transfer line may contain a hydrogen disengagement vessel which removes hydrogen gas used during the polymerization in the first reaction vessel before the reaction mixture reaches the second reaction vessel. Examples of such hydrogen disengagement vessels are taught at least by U.S. Pat. No. 6,921,804, which is incorporate herein by reference. The hydrogen disengagement vessel may remove from about 80% to about 100% of the hydrogen gas in the reaction mixture. In some preferred embodiments, the hydrogen disengagement vessel removes greater than 99% of the hydrogen from the reaction mixture.

The present invention may also allow for the use of hydrogen gas in the first, second or both reaction vessels. The inclusion of hydrogen gas in either reaction vessel may further improve the selectivity and specificity obtained by the catalytic process. Furthermore, the use of hydrogen gas may allow for a wider range of Cr/silica catalysts, temperature and other reaction conditions to be used which allows for more precise selection of the desired average molecular weight or the other physical properties of the resultant polymer.

II. Process Scale-up

The above methods can be further modified and optimized for preparative, pilot- or large-scale production, either batch or continuous, using the principles and techniques of process chemistry as applied by a person skilled in the art. Such principles and techniques are taught, for example, in Practical Process Research & Development (2012), which is incorporated by reference herein.

III. Definitions

For the groups and classes below, the following parenthetical subscripts further define the group/class as follows: "(Cn)" defines the exact number (n) of carbon atoms in the group/class. "(C≤n)" defines the maximum number (n) of carbon atoms that can be in the group/class, with the minimum number as small as possible for the group in question, e.g., it is understood that the minimum number of carbon atoms in the group "alkenyl$_{(C\le8)}$" or the class "alkene$_{(C\le8)}$" is two. For example, "alkoxy$_{(C\le10)}$" designates those alkoxy groups having from 1 to 10 carbon atoms. (Cn-n') defines both the minimum (n) and maximum number (n') of carbon atoms in the group. Similarly, "alkyl$_{(C2-10)}$" designates those alkyl groups having from 2 to 10 carbon atoms.

The term "saturated" as used herein means the compound or group so modified has no carbon-carbon double and no carbon-carbon triple bonds, except as noted below. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded.

The term "aliphatic" when used without the "substituted" modifier signifies that the compound/group so modified is an acyclic or cyclic, but non-aromatic hydrocarbon compound or group. In aliphatic compounds/groups, the carbon atoms can be joined together in straight chains, branched chains, or non-aromatic rings (alicyclic). Aliphatic compounds/groups can be saturated, that is joined by single bonds (alkanes/alkyl), or unsaturated, with one or more double bonds (alkenes/alkenyl) or with one or more triple bonds (alkynes/alkynyl).

The term "alkyl" when used without the "substituted" modifier refers to a monovalent saturated aliphatic group with a carbon atom as the point of attachment, a linear or branched, cyclo, cyclic or acyclic structure, and no atoms other than carbon and hydrogen. Thus, as used herein cycloalkyl is a subset of alkyl, with the carbon atom that forms the point of attachment also being a member of one or more non-aromatic ring structures wherein the cycloalkyl group consists of no atoms other than carbon and hydrogen. As used herein, the term does not preclude the presence of one or more alkyl groups (carbon number limitation permitting) attached to the ring or ring system. The groups —CH$_3$(Me), —CH$_2$CH$_3$(Et), —CH$_2$CH$_2$CH$_3$(n-Pr or propyl), —CH(CH$_3$)$_2$(i-Pr, $^i$Pr or isopropyl), —CH(CH$_2$)$_2$(cyclopropyl), —CH$_2$CH$_2$CH$_2$CH$_3$ (n-Bu), —CH(CH$_3$)CH$_2$CH$_3$(sec-butyl), —CH$_2$CH(CH$_3$)$_2$ (isobutyl), —C(CH$_3$)$_3$(tert-butyl, t-butyl, t-Bu or $^t$Bu), —CH$_2$C(CH$_3$)$_3$(neo-pentyl), cyclobutyl, cyclopentyl, cyclohexyl, and cyclohexylmethyl are non-limiting examples of alkyl groups. An "alkane" refers to the compound H—R, wherein R is alkyl as this term is defined above.

The term "alkenyl" when used without the "substituted" modifier refers to an monovalent unsaturated aliphatic group with a carbon atom as the point of attachment, a linear or branched, cyclo, cyclic or acyclic structure, at least one non-aromatic carbon-carbon double bond, no carbon-carbon triple bonds, and no atoms other than carbon and hydrogen. Non-limiting examples of alkenyl groups include: —CH=CH$_2$(vinyl), —CH=CHCH$_3$, —CH=CHCH$_2$CH$_3$, —CH$_2$CH=CH$_2$(allyl), —CH$_2$CH=CHCH$_3$, and —CH=CHCH=CH$_2$. The terms "alkene" or "olefin" are synonymous and refer to a compound having the formula H—R, wherein R is alkenyl as this term is defined above. A "terminal alkene" or "1-olefin" refers to an alkene having just one carbon-carbon double bond, wherein that bond forms a vinyl group at one end of the molecule.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

As used herein, average molecular weight refers to the weight average molecular weight (Mw) as determined by gel permeation chromatography (GPC).

"Admixing" when used in the context of this application refers to mixing of composition which may additionally comprise adding a component to that mixture. Additionally, the mixing can be performed before, after, or simultaneously with the addition of the component. The term admixing can be used to describe the mixing of a component which has just been introduced or reintroduced to a reactor along with a component that was already present. The term admixing does not imply that any new material is being added to the mixture but in the context of this application can be used to describe mixing or adding alone.

"Bimodal" when used in the context of this application refers to a polyolefin polymer which contains polyolefin polymer molecules with two different average molecular weights. A bimodal distribution may be illustrated through the presence of more than one peak in a graph or spectra that shows the plot of the molecular weights of the molecules in a composition such as gel permeation chromatography. In some cases, the average molecular weights differ from each other by more than 5% of the smaller average molecular weight.

The term "bimodal molecular weight distribution" in the context of this invention refers to a broad molecular weight distribution of the polymer that may exhibit two peaks (local maxima).

The terms "chromium/silica", "Cr/silica" or "chromium on silica" refer to a heterogeneous catalyst comprising Cr of any oxidation state and a silica and/or alumina support or matrix. In some embodiments, a chromium salt has been incorporated into a silica matrix. In some embodiments, the chromium salt is chromium oxide, wherein some or all of the chromium is in the Cr(IV) oxidation state. In some embodiments, silica and/or alumina matrix exhibits a high pore volume and a surface area suitable for the polymerization of olefins. Such a catalyst may also be modified with another metal or metal salt. In some embodiments, the other metal or metal salt may function as a cocatalyst to further enhance the activity of the catalyst and may additionally require activation before catalytic use.

A polymer property "high load melt index" or "HLMI" when used in the context of this application refers to the melt index as that term is defined below when the conditions match the conditions defined by condition F of the ASTM D1238 standard such that the capillary has a diameter of 2.096 mm and length of 8.000 mm and the test is carried out at 190° C. and at a pressure difference of 2.982 MPa.

The term "mole %" refers to the moles of the compound indicated relative to the moles of all the components of the reaction mixture, excluding the catalyst, the cocatalyst, and any solid support.

A polymer property "melt index" or "MI" when used in the context of this application refers to the ease of flow of the melt of thermoplastic polymer. The measurement is defined as the mass of a polymer in grams flowing in ten minutes through a capillary of a specific diameter and length by a specific pressure and at a specific temperature. This property is described in further detail by ASTM D1238 and ISO 1133.

A "method" is series of one or more steps undertaking lead to a final product, result or outcome. As used herein, the word "method" is used interchangeably with the word "process".

The above definitions supersede any conflicting definition in any reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

IV. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Methods and Materials

The catalyst used in these experiments was a high pore volume titanium modified Cr/silica catalyst with a pore volume~2.3 mL/g, surface area~550 $M^2$/g, [Cr]=1 wt %, and [Ti]=2.5 wt % on the activated catalyst. The catalyst was activated in a fluidized bed activator in air at 800° C., with the high temperature hold period of 6 hours. The catalyst was a gold free flowing powder.

The reactor used in these experiments was a 1.8 L vessel with a marine propeller for stirring. The stir rate was 800 rpm. The reactor was connected to feedstocks and a temperature control system. Data acquisition and control was afforded by a computer system. $H_2$ was added from a 95 mL vessel and measured as a pressure drop from the vessel.

Catalyst was charged to a catalyst injector in a glove box under $N_2$. The injector was connected to the reactor by purging the opening with $N_2$. Next, if used $H_2$ was added and if used hexene was added from a site glass. Then, 850 mL of isobutane are added and the ethylene turned on and added to about 20 psi below set point pressure. The reactor was lined out at reactor temperature (105° C.) and the catalyst injected with 50 mL of isobutane. The ethylene was turned back on to reach set point pressure (it is fed on demand during the run) and the pressure control and temperature control placed in automatic. A typical run lasts one hour. At the end of the run the ethylene supply was shut off and the reactor vented to remove volatile material. The polymer was removed from the reactor through a bottom dump valve and is collected as a dry powder. In a typical run 50 to 100 grams of polymer are made. Runs of examples A to C follows this procedure. Ethylene concentration in the reactor was calculated using Aspen Vapor Liquid Equilibrium software.

A simulated multi-reactor process started the same as the single reactor process listed above except that the catalyst charge size was reduced to about half the initial charge size. At the end of the one hour run, the amount of polymer made during the run was noted (ethylene flow totalizer). The ethylene was turned off and the reactor pressure vented to the vapor pressure of isobutane at the current polymerization temperature (to remove ethylene and hydrogen if used). The reactor temperature was then lowered to 85° C. The reactor still contained isobutane, polymer and active catalyst. If required, $H_2$ and hexene were added followed by ethylene to the new set point pressure. Then, the polymerization was run until about the same quantity of polymer is made in the second reactor conditions (ethylene flow totalizer) as made in the first reactor conditions. When the desired amount of polymer is made, the reactor was shut down with a similar process used to shut down the single reactor type run.

Example 2

Results of Comparison Polymerization Process with and without the Use of Hydrogen Gas Example A was a single reactor run simulating the conditions of the higher MI reactor run with $H_2$. The specific conditions are summarized in the table as well as the results of the run.

Example B was a single reactor run simulating the conditions of the higher MI reactor run without $H_2$. The specific conditions are summarized in the table as well as the results of the run.

Example C was a typical single reactor run with $H_2$. The specific conditions are summarized in the table as well as the results of the run. This run shows the catalyst's capability to produce a polymer of intermediate MI.

Example D was a multi-reactor run simulating the conditions of the higher MI reactor run with $H_2$ same as example A. The second reactor conditions were without $H_2$. The specific conditions are summarized in the table as well as the results of the run.

Example E was a multi-reactor run simulating the conditions of the higher MI reactor run with $H_2$ same as example A. The second reactor conditions were with $H_2$. The specific conditions are summarized in the table as well as the results of the run.

Example F was a multi-reactor run simulating the conditions of the higher MI reactor run without $H_2$ same as example B. The second reactor conditions were with $H_2$. The specific conditions are summarized in the table as well as the results of the run.

TABLE 2

| Molecular Weight Properties of the Produced Polyethylene Polymers | | | | |
|---|---|---|---|---|
| Example | Mz | Mw | Mn | PD |
| A | 881,839 | 135,133 | 13,529 | 9.99 |
| B | 889,523 | 134,401 | 10,809 | 12.43 |
| C | 857,406 | 147,124 | 13,756 | 10.70 |
| D | 1,250,593 | 227,233 | 18,340 | 12.39 |
| E | 1,120,372 | 192,927 | 15,546 | 12.41 |
| F | 1,409,551 | 228,901 | 15,362 | 14.90 |

Mn = number average molecular weight; Mw = weight average molecular weight; and Mz = z average molecular weight.

Examples A-C are examples of a Cr catalyst polymerized in a single reactor. Note the polymers produced have a relatively narrow molecular weight distribution as evidenced by the HLMI/MI values of 61.8 to 67.2. See Tables 1 and 2.

Examples D-F are bimodal simulation inventive examples showing that $H_2$ can be used in the first reactor, both reactors, or in the second reactor to tailor the polymer properties. The polymers made in these runs have a relatively broad molecular weight distribution as evidenced by higher HLMI/MI values of 157.7 to 195.4. See Table 1 in FIG. 1 and Table 2.

* * *

All of the compounds, complexes, and methods disclosed and claimed herein can be made and executed without undue experimentation in light of the present disclosure. While the compounds, complexes, and methods of this invention have been described in terms of preferred embodiments, it will be apparent to those of skill in the art that variations may be applied to the compounds, complexes, and methods, as well as in the steps or in the sequence of steps of the method described herein without departing from the concept, spirit, and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references to the extent that they provide exemplary procedural or other details supplementary to those set forth herein, are specifically incorporated herein by reference.

U.S. Pat. No. 2,825,721
U.S. Pat. No. 3,152,872
U.S. Pat. No. 3,242,150
U.S. Pat. No. 3,281,405
U.S. Pat. No. 3,592,880
U.S. Pat. No. 3,780,011
U.S. Pat. No. 3,819,811
U.S. Pat. No. 3,976,632
U.S. Pat. No. 4,031,298
U.S. Pat. No. 4,053,565
U.S. Pat. No. 4,173,548
U.S. Pat. No. 4,177,162
U.S. Pat. No. 4,297,460
U.S. Pat. No. 4,352,915
U.S. Pat. No. 4,357,448
U.S. Pat. No. 4,374,234
U.S. Pat. No. 4,613,484
U.S. Pat. No. 4,981,927
U.S. Pat. No. 5,037,911
U.S. Pat. No. 5,093,300
U.S. Pat. No. 5,198,400

U.S. Pat. No. 6,063,878
U.S. Pat. No. 6,147,171
U.S. Pat. No. 6,465,586
U.S. Pat. No. 6,632,896
U.S. Pat. No. 6,921,804
U.S. Pat. No. 7,034,092
European Patent 580930
PCT Patent Application 95/011930
Anderson, N. G., Practical Process Research & Development—A Guide For Organic Chemists, 2nd ed., Academic Press, New York, 2012.

What is claimed is:

1. A method of preparing a polyolefin having a bimodal molecular weight distribution, comprising:
   (a) preparing a reaction mixture comprising a monomer, a catalyst, and an organic solvent,
   (b) heating the reaction mixture under a first set of reaction conditions to effect a first polymerization comprising the polymerization of a first fraction of the monomer; and
   (c) heating the reaction mixture under a second set of reaction conditions to effect a second polymerization comprising the polymerization of a second fraction of the monomer;
wherein the monomer is a terminal alkene$_{(C2\text{-}8)}$, the catalyst comprises an oxide-supported chromium catalyst, and the first or second set of reaction conditions comprises the presence of hydrogen, provided that the first set of reaction conditions and the second set of reaction conditions are not the same; and whereby the method produces a polyolefin having a bimodal molecular weight distribution; and
wherein the catalyst comprises 0.1 to 2% by weight chromium.

2. The method of claim 1, wherein the terminal alkene$_{(C2\text{-}8)}$ is ethylene.

3. The method of claim 1, wherein the polyolefin is polyethylene.

4. The method of claims 1, wherein the organic solvent is isobutane.

5. The method of claim 1, wherein the first mode of the molecular weight distribution is from 80,000 Dalton to 130,000 Daltons and wherein the second mode of the molecular weight distribution is from about 84,000 Daltons ref 300,000 Daltons, provided that the first and the second modes differ by at least 4,000 Daltons.

6. The method of claim 1, wherein the first set of reaction conditions comprises a temperature from 85° C. to 110° C.

7. The method of claim 1, wherein the second set of reaction conditions comprises a temperature from 70° C. to 110° C.

8. The method of claim 1, wherein the catalyst further comprises one or more of the elements titanium, aluminum, fluorine, boron, and phosphorus.

9. The method of claim 8, wherein the catalyst further comprises 0.1 to 4% by weight titanium.

10. The method of claim 1, wherein the catalyst has a surface area from 250 m$^2$/g to 900 m$^2$/g and a pore volume from 1.5 mL/g to 3.0 mL/g.

11. The method of claim 1, wherein the hydrogen concentration of the first set of reaction conditions is from 0.1 to 2 mole %.

12. The method of claim 1, wherein the hydrogen concentration of the second set of reaction conditions is from 0.1 to 2 mole %.

13. The method of claim 1, further comprising reducing hydrogen concentration between steps (b) and (c) using a hydrogen disengagement vessel.

14. The method of claim 1, wherein the first or second polymerization further comprises a copolymerization of the monomer with a comonomer, wherein the comonomer is a terminal alkene $_{(C2\text{-}8)}$, provided that monomer and the comonomer are not the same.

15. The method of claim 14, wherein the comonomer is 1-hexene.

16. The method of claim 1 wherein the reaction mixture further comprises a cocatalyst.

17. The method of claim 16, wherein the cocatalyst is an alkyl metal of the formula M(R)$_n$, wherein M is Al$^{3+}$, B$^{3+}$, Zn$^{2+}$, or Li$^+$; R is alkyl$_{(C\leq 8)}$; and n is the number of alkyl groups, which corresponds to the oxidation state of M.

18. The method of claim 17, wherein the cocatalyst is triethyl boron.

19. The method of claim 1, wherein the polyolefin has a melt index from 0.02 g/10 minutes to 2 g/10 minutes, a high load melt index from 2 g/10 minutes to 100 g/10 minutes, or a high load melt index to melt index ratio from 80 to 250.

* * * * *